(12) United States Patent
Post

(10) Patent No.: US 10,180,163 B2
(45) Date of Patent: Jan. 15, 2019

(54) ROTATION-SPEED-INDEPENDENT STABILIZER FOR PASSIVE MAGNETIC BEARING SYSTEMS

(71) Applicant: Lawrence Livermore National Security, LLC, Livermore, CA (US)

(72) Inventor: Richard F Post, Walnut Creek, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 876 days.

(21) Appl. No.: 14/512,280

(22) Filed: Oct. 10, 2014

(65) Prior Publication Data

US 2016/0102704 A1 Apr. 14, 2016

(51) Int. Cl.
*H02K 7/09* (2006.01)
*F16C 32/04* (2006.01)

(52) U.S. Cl.
CPC ...... *F16C 32/0404* (2013.01); *F16C 32/0408* (2013.01)

(58) Field of Classification Search
CPC ....... H02K 7/09; F16C 32/04; F16C 32/0404; F16C 32/0408; F16C 3204/0406
USPC .................................................. 310/90, 90.5
See application file for complete search history.

(56) References Cited

U.S. PATENT DOCUMENTS

| 4,562,430 A * | 12/1985 | Robinson | F16C 32/0446 310/90.5 |
|---|---|---|---|
| 5,495,221 A | 2/1996 | Post | |
| 5,847,480 A | 12/1998 | Post | |
| 6,191,515 B1 | 2/2001 | Post | |
| 6,570,286 B1 | 3/2003 | Gabrys | |
| 7,876,010 B2 | 1/2011 | Post | |
| 2004/0174079 A1* | 9/2004 | Izraelev | A61M 1/101 310/90.5 |
| 2008/0252162 A1 | 10/2008 | Post | |
| 2011/0291507 A1 | 12/2011 | Post | |
| 2012/0098370 A1* | 4/2012 | Pinneo | F16F 15/305 310/90.5 |
| 2012/0098371 A1* | 4/2012 | Pinneo | F16C 32/0442 310/90.5 |
| 2012/0175985 A1 | 7/2012 | Post | |
| 2014/0265688 A1 | 9/2014 | Post | |

OTHER PUBLICATIONS

Earnshaw, "On the Nature of the Molecular Forces Which Regulate the Constitution of the Luminiferous Ether," Trans. of the Cambridge Phil. Soc., VII. Part I, pp. 97-116, 1839.
International Search Report and Written Opinion for PCT/US2014/025417 related to U.S. Appl. No. 13/827,245, 11 pages.

* cited by examiner

*Primary Examiner* — Hanh Nguyen

(74) *Attorney, Agent, or Firm* — John P. Wooldridge

(57) ABSTRACT

By employing a combination of magnetic forces and those from electrostatic fields, a new stabilizer is able, unlike those employing dynamic effects, to function at any speed with no need for sensors or dynamically generated electrical currents. Embodiments are provided that stabilize the radial, axial and tilt instability. In addition to its use for stabilization, the radial stabilizer described herein also functions as an eccentricity detector.

26 Claims, 6 Drawing Sheets

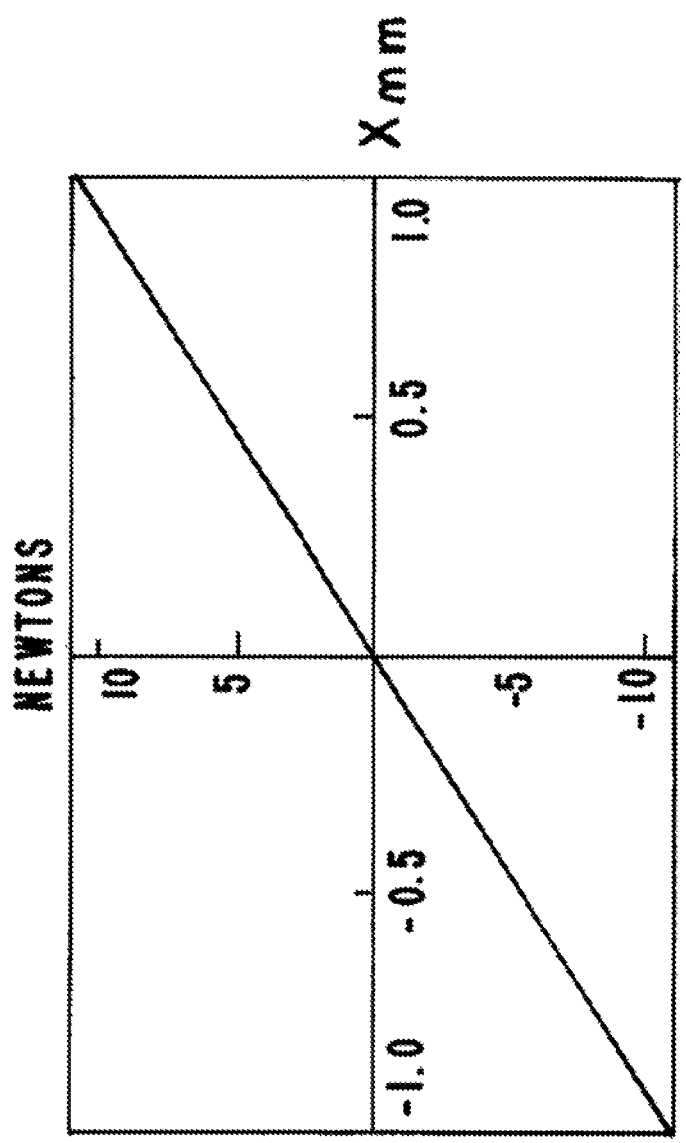

ROTATION-SPEED-INDEPENDENT STABILIZER FOR PASSIVE MAGNETIC BEARING SYSTEMS

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

Field of the Invention

The present invention relates to passive magnetic bearing systems, and more specifically, it relates to the utilization of static electrostatic forces between specially designed electrode configurations to overcome limitations imposed by Earnshaw's Theorem.

Description of Related Art

Current techniques for overcoming Earnshaw's Theorem include "active" magnetic bearings having position sensor-controlled electromagnets, and the Lawrence Livermore National Laboratory (LLNL) passive magnetic bearing systems that take advantage of electrodynamic forces from rotating Halbach permanent magnet arrays interacting with specially configured stator windings. Such stabilizers obviously cannot function at zero speed, and thus they require the use of retractable mechanical bearings in operation.

The essence of Earnshaw's theorem, when it is applied to magnetic forces between permanent magnets, is that it proves that in static equilibrium it is impossible to stably levitate a permanent magnet element through the forces exerted by any fixed configuration of other permanent magnets. Earnshaw's Theorem also applies to electric charges, where it asserts that no fixed configuration of static charges can be found that will stably levitate another static charge. Past approaches to overcoming the magnetic version of the theorem, such as those described by the present inventor in U.S. Pat. No. 5,495,221[2] and U.S. Pat. No. 5,847,480[3] have been based on the long-accepted premise that Earnshaw's Theorem can only be overcome through the use of dynamic effects, i.e., either those of sensor-based feedback systems, as they are employed in so-called "active" magnetic bearings, or through the use of rotation-dependent stabilizing forces, as described in the above-listed patents. A technique for stabilization that does not depend on dynamic effects is desirable. It would be beneficial if such a system, when used in magnetically levitated rotating systems, e.g., flywheel energy storage systems, could operate equally well at any rotation speed, including zero speed. The present invention provides these benefits.

SUMMARY OF THE INVENTION

This invention pertains to a new form of stabilizer for passive magnetic bearing systems. It is based on a new insight into means for overcoming the strictures imposed by Earnshaw's Theorem. The new invention, capable of stabilizing a levitating passive bearing system at any speed, including zero speed, utilizes electrostatic forces between specially configured rotor electrodes and stationary electrodes. An example of such a configuration is one made up of metallic rings in the stator and matching-diameter metallic or dielectric rings on the rotor. The stator electrodes are charged from a dc or an rf source to create an electric field between the specially configured rotor electrodes and stationary electrodes. Lateral motion of the rotor rings then leads to a reduction in the electrical capacity of the system, resulting in a restoring force the magnitude of which is independent of the rotation speed. In addition to its stabilization function, the new stabilizer can also function as a continuous monitor of the degree of balance-dependent eccentricity of the rotor. This property can be employed to permit in situ balancing of the rotor at the time of manufacturing the unit, and then, when the unit is in operation, to provide a continuous monitoring of unbalance, such as would occur from incipient failure of the rotor.

BRIEF DESCRIPTION OF THE DRAWINGS

The accompanying drawings, which are incorporated into and form a part of the disclosure, illustrate embodiments of the invention and, together with the description, serve to explain the principles of the invention.

FIG. 3 is a plot of the restoring force of a two-cell, three-ring stabilizer vs displacement.

DETAILED DESCRIPTION OF THE INVENTION

Figure 1:
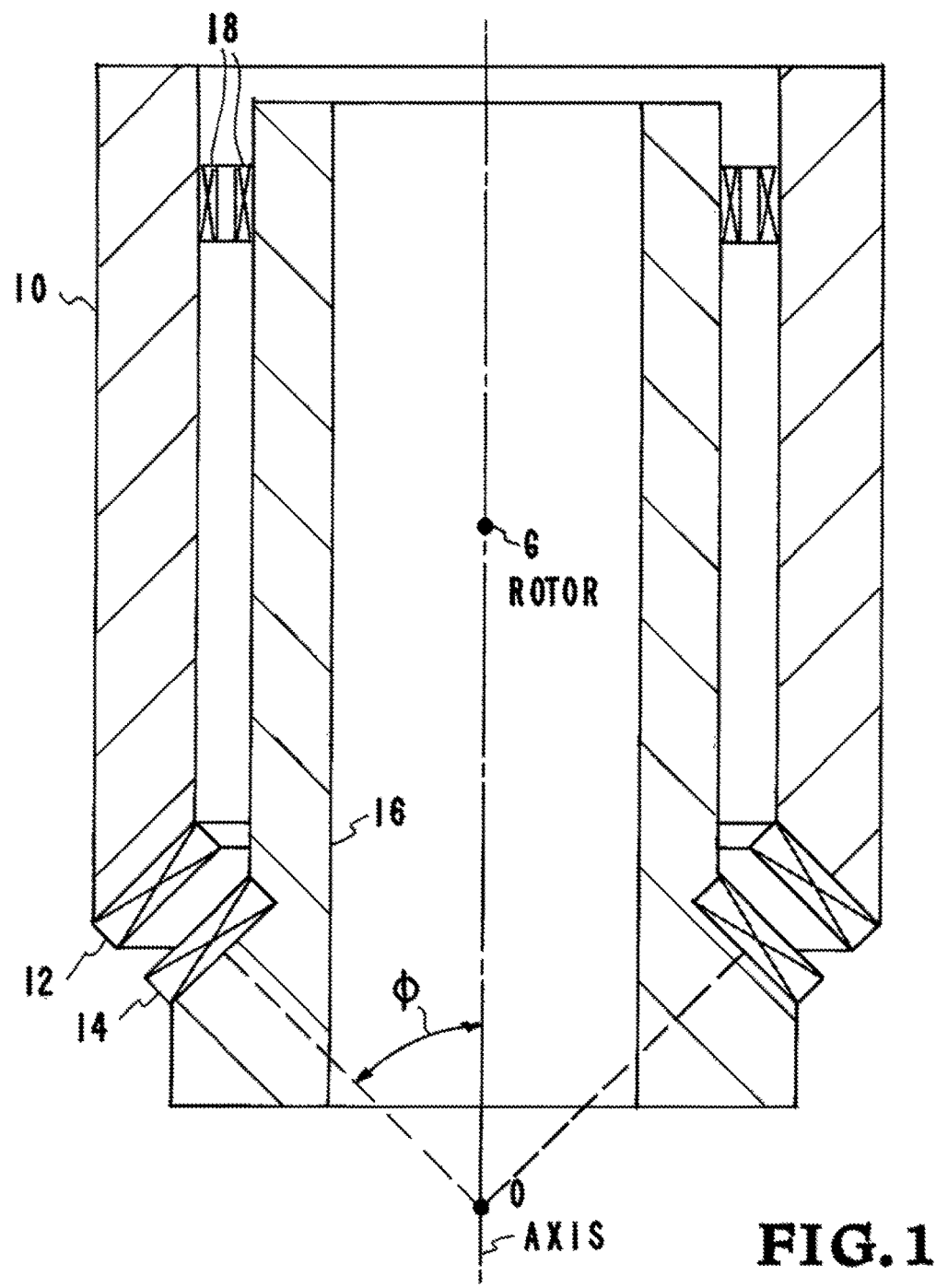
FIG. 1 is a schematic cross-sectional drawing of rotor levitated between two conical repelling passive magnetic bearing elements.

This invention provides new techniques for overcoming the limitations imposed by Earnshaw's Theorem[1] as they are encountered in performing the design of passive magnetic bearing systems. The key feature of the new stabilizer is that it accomplishes its stabilization by employing both the magnetic forces between permanent magnets and the static electrostatic forces between specially designed electrode configurations. In that it uses electrostatic forces, it resembles the electrostatics-based stabilizer as described in U.S. patent application Ser. No. 13/827,245 titled "An Electrostatic Stabilizer for a Passive Magnetic Bearing System," incorporated herein by reference. That stabilization technique, however, depends on the use of a source of radio frequency power together with circuit resonance effects. In this way it creates a feedback mechanism that accomplishes the stabilization. In contrast, the new stabilizer only requires a source of constant amplitude dc or rf voltage (at zero current for dc charging after the electrodes are charged). In special circumstances, the amplitude of the voltage source could be momentarily increased, thus increasing the stiffness of the stabilizer, in response to, for example, a seismic event.

In what follows it is shown that the new combined magnetic-electrostatic system can be made to be stable against all three of the potentially unstable perturbations of the bearing system, namely, axial, radial and tilt motion.

In the design of the magnetic elements of a passive magnetic bearing system, it is always possible to create a situation where only one of the above perturbations is unstable. In an example case described below, the passive magnetic bearing system is designed to be stable against axial and radial motion, but remains unstable against tilt motion. The new stabilizer is then designed to stabilize this motion. Axial and radial motion stabilizer designs are also described herein.

The basic premise upon which stabilizers prior to this teaching are based, as noted above, is that dynamic elements are required to overcome Earnshaw's Theorem in magnetic systems involving permanent magnets for levitation. Exemplary dynamic elements include (i) sensor-controlled electromagnets in active magnetic bearing system and (ii) rotation-dependent "Halbach stabilizers" in the passive bearing systems.

As noted above, the new stabilizer does not require dynamic elements in order to function. The new insight involved in the present invention is that it is possible to overcome the constraints of Earnshaw's Theorem by employing a combination of static magnetic fields and static electric fields. It is then possible to stabilize a magnetically levitated system at all speeds, including zero speed.

In any vacuum-dielectric condenser system held at a fixed potential, a decrease in capacity caused by a displacement of an electrode is accompanied by a force on that electrode that is oppositely directed. This force is given by Equation 1, below.

$$F = -\left(\frac{1}{2}\right)\frac{dC}{dx}V_0^2 \ Newtons \quad (1)$$

Here C (farads) is the capacity of the system of ring groups, x (m.) is the displacement of the group attached to the rotor, and $V_0$ (Volts) is the applied voltage. Since the force is oppositely directed to the direction of the displacement, the stiffness (given by the x derivative of F), is positive, i.e., stabilizing.

The passive bearing system that the exemplary embodiment of the invention described here is designed to stabilize is one designed to be stable against vertical (axial) and radial displacements. An example of such a system is shown in cross-section schematically in FIG. 1. As shown in the figure, a vertical axis rotor 10 is being levitated by two conical repelling bearings. One bearing 12 is located at the bottom of rotor 10, and the other opposing bearing 14 is located on the stator 16. In this system, tilt motion is stabilized with a stabilizer 18, which can be a conventional stabilizer as known in the art, or can be a stabilizer according to the teachings of the present invention.

Figure 2A:
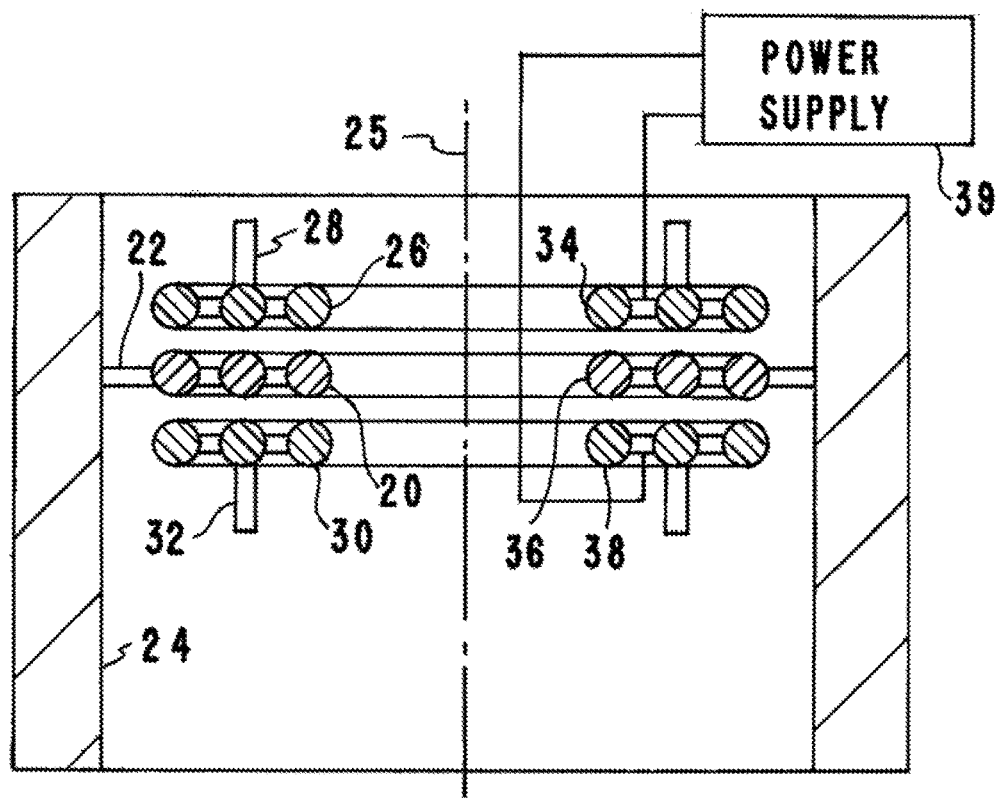
FIG. 2A is a schematic cross-sectional drawing of a static stabilizer for providing radial stability.

One embodiment of the new stabilizer is shown schematically in FIG. 2A. It depicts in cross section an assembly of three ring groups. This stabilizer can be substituted for the conventional stabilizer 18 of FIG. 1. In the example shown, each group contains three rings. However, depending on the stiffness required, each "group" could be made up of any number of individual rings, including the case of one ring. The upper and lower ring groups are stationary and are connected to a source of dc or rf voltage. If charged with a dc voltage source, the upper and lower potentials would be equal in magnitude but opposite in sign. If charged by an rf source the upper and lower ring groups would be charged at the same frequency, but phased 180° with respect to each other. The central ring group is attached to the rotor. The rings could either be made of metal or made of an insulating material with a high dielectric constant. Their support structure would be made of a strong dielectric material, for example glass-fiber composite. Electrically, the three-ring assembly represents two capacitors in series. In the position of stable equilibrium of the bearing assembly, i.e., when the magnets and the stabilizer rings are all concentric, the system capacity is a maximum. A sidewise displacement of the rotating ring group would result in a decrease in the capacity, whereas to lowest order a vertical displacement would result in no change in capacity, since the decrease in gap between the central ring group and either the upper or the lower ring group would be cancelled out by a corresponding increase in gap of the opposite ring group. The sidewise displacement could occur due to a radial or tilt motion of the rotor with respect to the central axis 25.

More specifically, FIG. 2A shows a group 20 of three rings attached to a support structure 22 which in turn is attached to the inner wall of rotor 24. A group 26 of three metal rings attached to a support structure 28 is located on one side of group 20 and another group 30 of three metal rings attached to a support structure 32 is located on the other side of group 20. The rings of groups 20, 26 and 30 can have shapes other that the circular cross-sectional shape shown in the figure. The number of rings in each group does not have to be three and can be determined according to the design requirements of the system. Further, a single ring can be substituted for each group in the embodiments disclosed herein. The support structures 28 and 32 must be attached to a stationary structure, which could be a stator. The rotating group of rings 20 may be formed of dielectric or metal and the support structure 22 may be formed of insulating material. One lead from a charging supply can be connected to ring group 26 and the other lead can be connected to ring group 30. As an example, when a voltage from power supply 39 is applied from ring 34 to ring 38 such that the charge exists across ring 36, a radial or tilt movement of rotor 24 with respect to axis 25 will increase the gap between ring 36 and each of rings 34 and 38, the increased gap will result in a decrease in capacitance between ring 36 and each of rings 34 and 38. As explained herein, such a decrease in capacitance will produce a force that is oppositely directed to the direction of the displacement, i.e., a restoring force that will urge the rotor back toward its position of equilibrium. For use as a tilt stabilizer, the greater the moment arm, the more effective the stabilizer. That is, placing the stabilizer higher on the rotor results in a more effective tilt stabilizer. Note that this is but one example of a radial or tilt stabilizer according to the principles of the present invention. Other configurations utilizing the property of Equation 1 will be understood by those skilled in the art based on the teachings herein and such configurations are within the scope of the present invention.

Figure 2B:
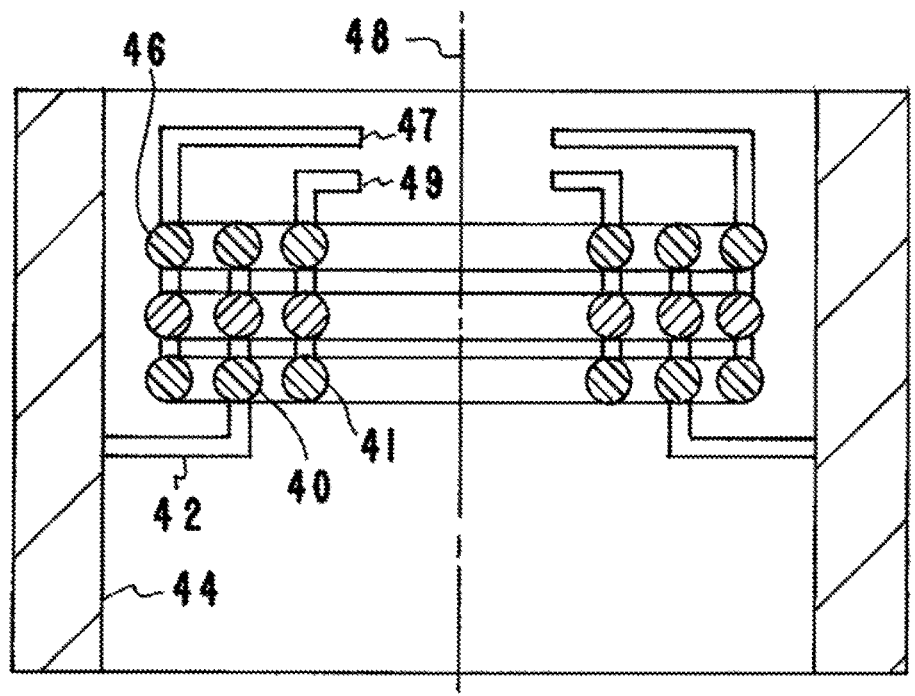
FIG. 2B is a schematic cross-sectional drawing of a static stabilizer for providing axial stability.

FIG. 2B shows a cross-sectional view of an axial stabilizer according to the principles of the present invention. In this embodiment, a group 40 of three dielectric or metallic rings is attached to an insulated support structure 42 which is attached to rotor 44. One group 46 of three metal rings is located on one side of group 40 and is attached by support 47 to a stationary support and another group 48 of three metal rings is located on the other side of group 40 and is attached by support 49 to a stationary support. Rotor 44 is rotatable about an axis of rotation 48. As an example, a power supply can be connected as shown in FIG. 2A. Ring 46 has a diameter that is greater than that of ring 40. Ring 41 has a diameter that is less than that of ring 40.

Figure 2C:
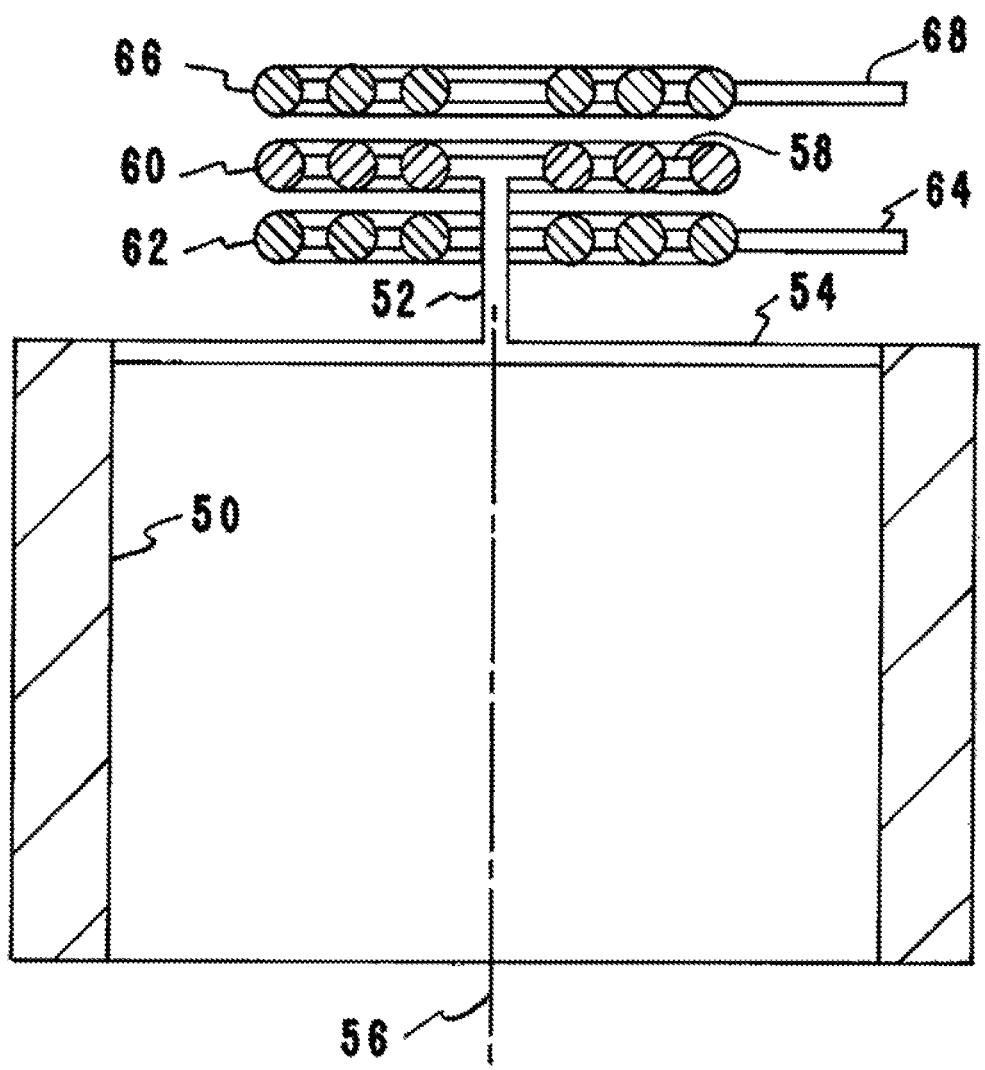
FIG. 2C is a schematic cross-sectional drawing of a static stabilizer for providing tilt stability.
Figure 2D:
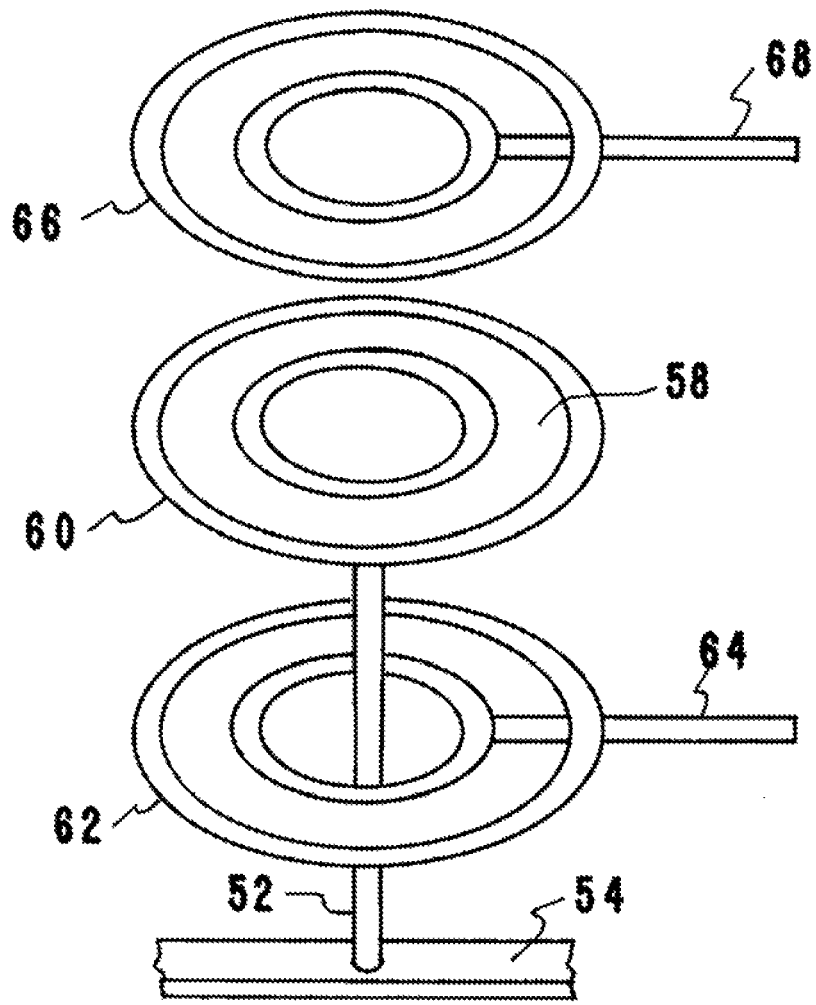
FIG. 2D shows a perspective view of the static stabilizer of FIG. 2C.

FIG. 2C shows a cross-sectional view of a tilt stabilizer according to the principles of the present invention. Rotor 50 is shown in cross-section and includes a support rod 52 attached to the rotor by support 54 which spans rotor 50. Support rod 52 is fixed to be coaxial with the rotor's rotational axis 56. Rod 52 is attached to a support 58 to which is attached a group 60 of rotatable concentric rings which rotate with the rotor. A group 62 of stationary rings is concentrically aligned around support 52 and has its center of radius located on the rotor's axis of rotation. Stationary group 62 is not in contact with support 52 and is attached to support 64. Stationary group 66 is attached to support 68. FIG. 2D shows a perspective view (not to scale) of the static stabilizer of FIG. 2C. As an example, a power supply can be connected as shown in FIG. 2A.

Depending on the quantitative requirements of the application in which the stabilizer is to be used, it could employ a single trio of ring groups, or two such trios, one near the top of the rotor and one near the bottom of the rotor. In addition, two or more concentric rings could be used to form a group or a "cell."

In the event that it is required to still further reduce the small negative stiffness associated with vertical displacements of the rings, their location within a ring group could be a mix of vertical positions, with alternate rings displaced slightly above and below the midplane, thus cancelling out the capacity change to a higher order.

In addition, the magnitude of the negative stiffness for vertical displacements is affected by the shape of the electrodes. For example, electrodes in the form of an assembly of parallel-plate capacitors would have a low value of negative stiffness since the change in capacity for vertical displacement of the central electrode assembly is even lower for such a configuration than it would be for a trio of rod groups.

A computer code has been written that simulates the stabilizer functions and provides quantitative evaluation of its stabilizing stiffness and other parameters. We consider first an example of the computed radial stiffness of a simple form of the stabilizer, one in which each ring "group" contains a single ring, for a total of three rings in the stabilizer cell. The plot of restoring force and the numbers given for stiffness are for a pair of such cells, one at the top of the rotor and one at the bottom. The diameter of each of the three rings in a cell is 0.5 meters and the diameter of the rod from which each was made is 0.01 m. Within each cell the vertical gap between the rods is 2.0 mm.

FIG. 3 is a plot of the radial restoring force of the pair of stabilizers as a function of radial displacement, when the potential difference between the upper ring and the central ring is +25 kilovolts, and that between the lower ring and the central ring is −25 Kv. For this case the stiffness of the two-cell stabilizer is +11.2 Newtons/mm.

It should be emphasized that the stiffness of the stabilizer system is independent of rotation speed. This means that it will not be necessary to have any kind of "lift-off" bearing to keep the rotor centered when at rest or at start-up of the system. Also, the stiffness is directly controllable through variation of the charging voltages.

Figure 4:
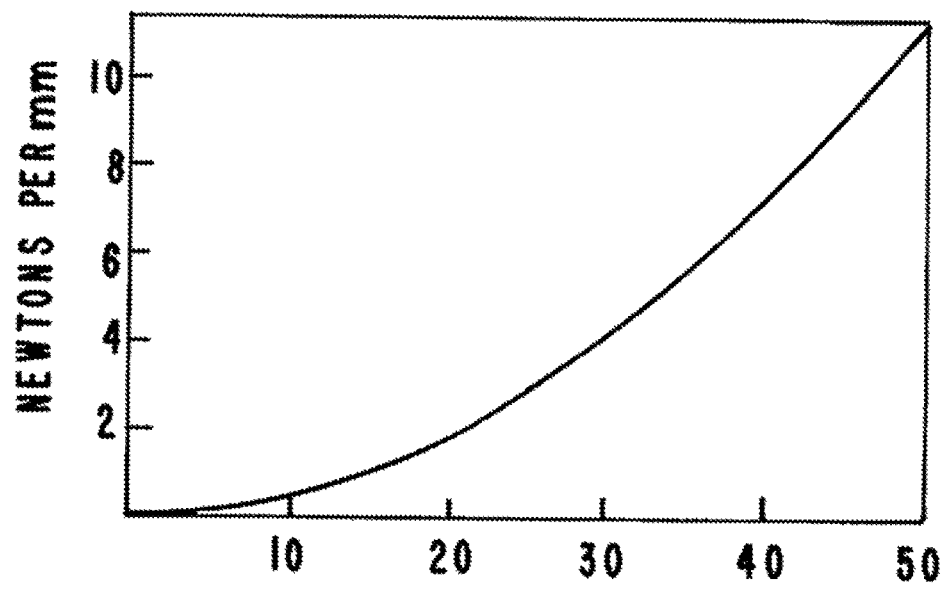
FIG. 4 is a plot of the variation of a two-cell, three-ring, stabilizer as a function of the total applied voltage.

As noted in the Introduction, this means of control of the stiffness could be used at an energy storage bank site to counter a seismic event. In a vehicular-mounted unit it could be used to compensate for accelerations encountered on the road. As an example of this stiffness control, FIG. 4 is a plot of the stiffness of the unit of FIG. 3 as function of the charging voltage.

It should be emphasized that the results shown in the above figures are those for a "minimal" stabilizer system, that is one for which there are only three rings per cell. If larger values of stiffness are required, more rings per cell could be employed, up to a limit set by geometric constraints.

In the operation of the stabilizer in, for example, an EMB, the presence of an unbalance in the rotor will result in an oscillatory displacement of the rotor rings of the stabilizer. The periodic change in capacity from this displacement will, in turn, lead to an ac current (in the case of dc excitation), or a modulation of the charging current (in the case of rf excitation of the stabilizer). The magnitude of these unbalance-related currents will be proportional to the amount of unbalance. This fortuitous property of the stabilizer can be utilized in three circumstances. The first one occurs during the manufacturing and testing of the EMB (or any other rotating machinery that employs the stabilizer). Rather than having to balance the rotor prior to final assembly on a balancing machine, balancing can be performed in situ by connecting a current detector to the charging supply. The second application is to employ the stabilizer currents as an "early warning" of a possible incipient failure of the rotor, simply by monitoring the current in that unit. The third application utilizes the response of the stabilizer current to an acceleration, such as a seismic event, to momentarily increase the charging voltage, thereby damping out the effect, much in the same manner as so-called "noise-cancelling" headphones operate.

Figure 5:
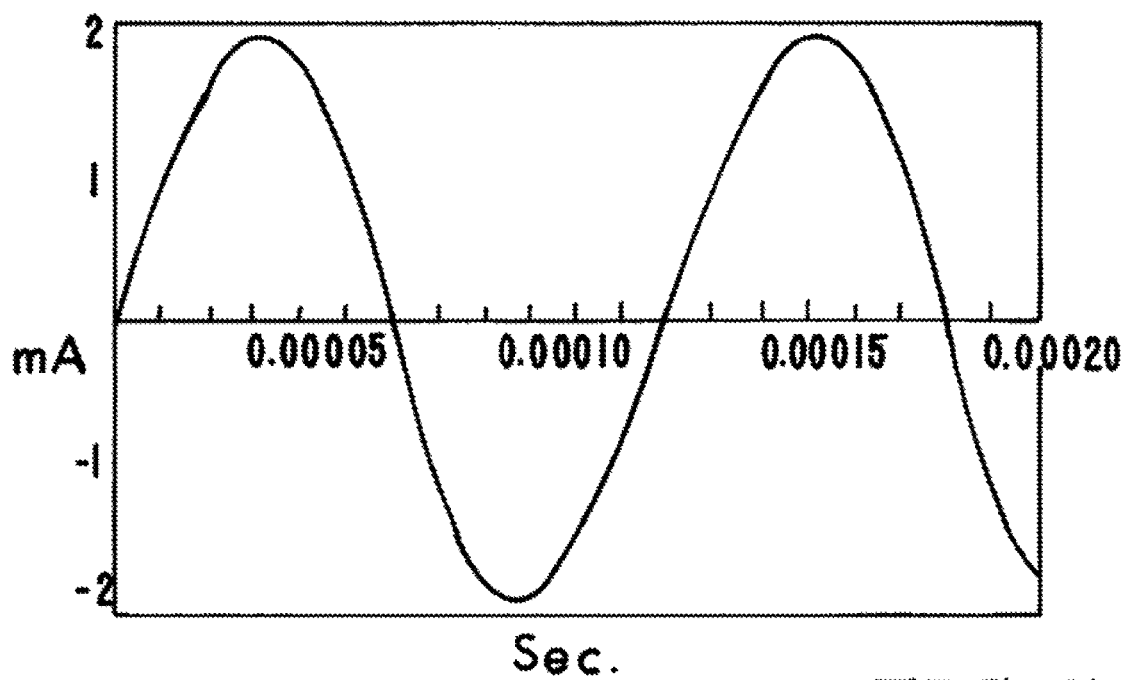
FIG. 5 shows the computer-code-predicted response of the stabilizer charging circuit to an unbalance-produced eccentricity of 1.0 mm.

To illustrate the unbalance detection response of the stabilizer, FIG. 5, is a plot of the computer simulation of a stabilizer response to a transverse oscillation with an amplitude of 1.0 mm.

A stabilizer concept has been described that employs a new approach to the age-old magnetic bearing instability problem posed by Earnshaw's Theorem. By employing a combination of magnetic forces and those from electrostatic fields, the new stabilizer is able, unlike those employing dynamic effects, to function at any speed with no need for sensors or dynamically generated electrical currents. The embodiment described in this document is designed to stabilize the radial instability associated, for example, with levitation of a rotor by upper and lower repelling annular permanent-magnets. The concept could equally well be applied to the opposite situation, i.e., the axial instability of a rotor levitated by attractive forces from two or more annular bearing elements. Here the rotating element could consist of sets of metallic rings mounted top and bottom on the inner surface of the rotor, facing matching rings on the stator.

In addition to its use for stabilization, the radial stabilizer described in this document was also shown to function as an eccentricity detector, with uses both during the manufacture of a system employing it, and later, during operation of the system, as a detector of incipient failure and, under the proper circumstances, as a means to damp out the effect of accelerations (such as seismic events).

REFERENCES

[1] S. Earnshaw, "On the Nature of the Molecular Forces which regulate the Constitution of the Luminiferous Ether," Trans. of the Cambridge Phil. Soc., VII. Part I, p. 97 (1839)
[2] R. F. Post: "Dynamically Stable Magnetic Suspension/Bearing System," issued Feb. 27, 1996.

[3] R. F. Post: "Passive Magnetic Bearing Element with Minimal Power Losses," issued Dec. 8, 1998.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. An apparatus, comprising:
a rotatable cylinder having a central longitudinal axis;
means for utilizing static electrostatic forces to stabilize at least one instability of said cylinder, wherein said at least one instability is selected from the group consisting of radial, axial and tilt; and
means for utilizing magnetic forces between permanent magnets to stabilize any instability of said group that is not stabilized by said static electrostatic forces, wherein said means for utilizing static electrostatic forces to stabilize at least one instability of said cylinder comprises:
a single first ring centered on said axis, concentric with, fixedly attached to, and electrically isolated from said cylinder, said single first ring having a first diameter and comprising material selected from the group consisting of dielectric or metal;
a stationary single second ring centered on said axis, concentric with said cylinder and having a second diameter overlapping said first diameter and comprising metal;
a stationary single third ring centered on said axis, concentric with said cylinder and having a third diameter overlapping said first diameter and comprising metal, wherein said single first ring is between and spaced from said single second ring and said single third ring; and
a first power supply having a first lead and a second lead, wherein said first lead is connected to said single second ring and said second lead is connected to said single third ring.

2. The apparatus of claim 1, wherein said first power supply is selected from a group consisting of a source of dc voltage and a source of rf voltage.

3. The apparatus of claim 1, wherein said first ring is located above the center line of said cylinder.

4. The apparatus of claim 1, wherein said first ring is located above the top of said rotor.

5. The apparatus of claim 1, wherein said first ring is attached to said cylinder with a support rod attached to said cylinder by a support structure which spans said cylinder, wherein said support rod is fixed to be coaxial with the said longitudinal axis.

6. The apparatus of claim 1, further comprising:
one or more additional first rings fixedly attached to said first ring, wherein each ring of said one or more additional first rings has a different diameter than said first ring and all other rings of said one or more additional first rings;
one or more additional second rings fixedly attached to said second ring, wherein each ring of said one or more additional second rings has a different diameter than said first ring and all other rings of said one or more additional second rings; and
one or more additional third rings fixedly attached to said third ring, wherein each ring of said one or more additional third rings has a different diameter than said third ring and all other rings of said one or more additional third rings.

7. An apparatus, comprising:
a rotatable cylinder having a central longitudinal axis;
means for utilizing static electrostatic forces to stabilize at least one instability of said cylinder, wherein said at least one instability is selected from the group consisting of radial, axial and tilt; and
means for utilizing magnetic forces between permanent magnets to stabilize any instability of said group that is not stabilized by said static electrostatic forces, wherein said means for utilizing static electrostatic forces to stabilize at least one instability of said cylinder comprises:
a single first ring centered on said axis, concentric with, fixedly attached to, and electrically isolated from said cylinder, said single first ring having a first diameter and comprising material selected from the group consisting of dielectric or metal;
a stationary single second ring centered on said axis, concentric with said cylinder and having a second diameter greater than said first diameter, wherein said stationary single second ring comprises metal;
a stationary single third ring centered on said axis, concentric with said cylinder and having a third diameter less than said first diameter, wherein said single third ring comprises metal, wherein said single first ring is between and spaced from said single second ring and said single third ring, wherein said single first ring and said single second ring and said single third ring are all located such that they overlap on a plane perpendicular with said central longitudinal axis; and
a power supply having a first lead and a second lead, wherein said first lead is connected to said single second ring and said second lead is connected to said single third ring.

8. The apparatus of claim 7, wherein said first power supply is selected from a group consisting of a source of dc voltage and a source of rf voltage.

9. The apparatus of claim 7, wherein said first ring is located above the centerline of said cylinder.

10. The apparatus of claim 7, wherein said first ring is located above the top of said rotor.

11. The apparatus of claim 7, wherein said first ring is attached to said cylinder with a support rod attached to said cylinder by a support structure which spans said cylinder, wherein said support rod is fixed to be coaxial with the said longitudinal axis.

12. The apparatus of claim 7, further comprising:
one or more additional first rings electrically and fixedly attached to said first ring, wherein each ring of said one or more additional first rings has the same diameter as said first ring and all other rings of said one or more additional first rings;
one or more additional second rings electrically and fixedly attached to said second ring, wherein each ring of said one or more additional second rings has the same diameter as said second ring and all other rings of said one or more additional second rings; and
one or more additional third rings electrically and fixedly attached to said third ring, wherein each ring of said one or more additional third rings has the same diameter as said third ring and all other rings of said one or more additional third rings.

13. A method, comprising:
providing a rotatable cylinder having a central longitudinal axis;
utilizing static electrostatic forces to stabilize at least one instability of said cylinder, wherein said at least one instability is selected from the group consisting of radial, axial and tilt; and
utilizing magnetic forces between permanent magnets to stabilize any instability of said group that is not stabilized by said static electrostatic forces, wherein the step of utilizing static electrostatic forces to stabilize at least one instability of said cylinder is carried out with an apparatus comprising:
a single first ring centered on said axis, concentric with, fixedly attached to, and electrically isolated from said cylinder, said single first ring having a first diameter and comprising material selected from the group consisting of dielectric or metal;
a stationary single second ring centered on said axis, concentric with said cylinder and having a second diameter overlapping said first diameter and comprising metal;
a stationary single third ring centered on said axis, concentric with said cylinder and having a third diameter overlapping said first diameter and comprising metal, wherein said single first ring is between and spaced from said single second ring and said single third ring; and
a first power supply having a first lead and a second lead, wherein said first lead is connected to said single second ring and said second lead is connected to said single third ring, the method further comprising providing voltage from said first power supply to said second ring and said third ring.

14. The method of claim 13, wherein said first power supply is selected from a group consisting of a source of dc voltage and a source of rf voltage.

15. The method of claim 13, wherein said first ring is located above the center line of said cylinder.

16. The method of claim 13, wherein said first ring is located above the top of said rotor.

17. The method of claim 13, wherein said first ring is attached to said cylinder with a support rod attached to said cylinder by a support structure which spans said cylinder, wherein said support rod is fixed to be coaxial with the said longitudinal axis.

18. The method of claim 13, wherein said apparatus further comprises:
one or more additional first rings fixedly attached to said first ring, wherein each ring of said one or more additional first rings has a different diameter than said first ring and all other rings of said one or more additional first rings;
one or more additional second rings fixedly attached to said second ring, wherein each ring of said one or more additional second rings has a different diameter than said first ring and all other rings of said one or more additional second rings; and
one or more additional third rings fixedly attached to said third ring, wherein each ring of said one or more additional third rings has a different diameter than said third ring and all other rings of said one or more additional third rings.

19. A method, comprising:
providing a rotatable cylinder having a central longitudinal axis;
utilizing static electrostatic forces to stabilize at least one instability of said cylinder, wherein said at least one instability is selected from the group consisting of radial, axial and tilt; and
utilizing magnetic forces between permanent magnets to stabilize any instability of said group that is not stabilized by said static electrostatic forces, wherein the step of utilizing static electrostatic forces to stabilize at least one instability of said cylinder is carried out with an apparatus comprising:
a first ring centered on said axis, concentric with, fixedly attached to, and electrically isolated from said cylinder, said first ring having a first diameter and comprising material selected from the group consisting of dielectric or metal;
a stationary second ring centered on said axis, concentric with said cylinder and having a second diameter greater than said first diameter, wherein said second ring comprises metal;
a stationary third ring centered on said axis, concentric with said cylinder and having a third diameter less than said first diameter, wherein said third ring comprises metal, wherein said first ring is between and spaced from said second ring and said third ring, wherein said first ring and said second ring and said third ring are all located such that they overlap on a plane perpendicular with said central longitudinal axis; and
a power supply having a first lead and a second lead, wherein said first lead is connected to said second ring and said second lead is connected to said third ring, the method further comprising providing voltage from said first power supply to said second ring and said third ring.

20. The method of claim 19, wherein said first power supply is selected from a group consisting of a source of dc voltage and a source of rf voltage.

21. The method of claim 19, wherein said first ring is located above the centerline of said cylinder.

22. The method of claim 19, wherein said first ring is located above the top of said rotor.

23. The method of claim 19, wherein said first ring is attached to said cylinder with a support rod attached to said cylinder by a support structure which spans said cylinder, wherein said support rod is fixed to be coaxial with the said longitudinal axis.

24. The method of claim 19, wherein said apparatus further comprises:
one or more additional first rings electrically and fixedly attached to said first ring, wherein each ring of said one or more additional first rings has the same diameter as said first ring and all other rings of said one or more additional first rings;
one or more additional second rings electrically and fixedly attached to said second ring, wherein each ring of said one or more additional second rings has the same diameter as said second ring and all other rings of said one or more additional second rings; and
one or more additional third rings electrically and fixedly attached to said third ring, wherein each ring of said one or more additional third rings has the same diameter as said third ring and all other rings of said one or more additional third rings.

25. An apparatus, comprising:

a rotatable cylinder having a central longitudinal axis;

means for utilizing static electrostatic forces to stabilize at least one instability of said cylinder, wherein said at least one instability is selected from the group consisting of radial, axial and tilt; and means for utilizing magnetic forces between permanent magnets to stabilize any instability of said group that is not stabilized by said static electrostatic forces, wherein said means for utilizing static electrostatic forces to stabilize at least one instability of said cylinder provides stabilization of said cylinder at any speed including zero speed.

26. A method, comprising:

providing a rotatable cylinder having a central longitudinal axis;

utilizing static electrostatic forces to stabilize at least one instability of said cylinder, wherein said at least one instability is selected from the group consisting of radial, axial and tilt; and utilizing magnetic forces between permanent magnets to stabilize any instability of said group that is not stabilized by said static electrostatic forces, wherein said means for utilizing static electrostatic forces to stabilize at least one instability of said cylinder provides stabilization of said cylinder at any speed including zero speed.

* * * * *